(12) United States Patent
Katapadi (10) Patent No.: US 8,280,027 B2
(45) Date of Patent: Oct. 2, 2012

(54) METHOD TO COLLECT AND MANAGE SMART DIALPLAN FOR SESSION INITIATION PROTOCOL DEVICES

(75) Inventor: Umesh P. Katapadi, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 1185 days.

(21) Appl. No.: 11/926,349

(22) Filed: Oct. 29, 2007

(65) Prior Publication Data

US 2009/0110176 A1  Apr. 30, 2009

(51) Int. Cl.
H04M 3/42 (2006.01)
(52) U.S. Cl. ......... 379/216.01; 379/201.01; 379/355.02; 370/352
(58) Field of Classification Search ............. 379/201.01, 379/216.01, 355.01, 355.02; 370/352
See application file for complete search history.

(56) References Cited

U.S. PATENT DOCUMENTS

| 2005/0008008 | A1* | 1/2005 | Ohura ........................... 370/352 |
| 2006/0062372 | A1* | 3/2006 | Lowmaster ............... 379/216.01 |
| 2006/0177036 | A1 | 8/2006 | Caballero-McCann et al. |
| 2006/0177039 | A1* | 8/2006 | Caballero-McCann et al. ........................ 379/221.13 |
| 2009/0274142 | A1* | 11/2009 | Diebel ........................ 370/352 |

FOREIGN PATENT DOCUMENTS

DE   102005045890   * 4/2007

* cited by examiner

*Primary Examiner* — Antim Shah
(74) *Attorney, Agent, or Firm* — P. Su (57) ABSTRACT

Methods and apparatus for dialing numbers using a session initial protocol device are disclosed. According to one aspect of the present invention, a method includes obtaining at least a first part of an input string associated with a dialplan. The input string includes at least one character. The method also includes determining if at least a first potential target string stored in a local cache includes the first part of the input string, and accessing an external call manager arrangement if the first potential target string stored in the local cache does not include the first part of the input string.

16 Claims, 7 Drawing Sheets

| DIGITS ←680a | TIMESTAMP ←680b |
|---|---|
| 1234567 | 010107 0:01:25 |
| 2345678 | 010507 11:12:05 |
| 9T3456789 | 123106 23:00:02 |
| 9FAC4567890 | 070707 0:07:07 |

METHOD TO COLLECT AND MANAGE SMART DIALPLAN FOR SESSION INITIATION PROTOCOL DEVICES

BACKGROUND OF THE INVENTION

The present invention relates generally to call routing based on smart dialplans, and how to create, as well as maintain, a smart dialplan in a device.

Session Initiation Protocol (SIP) is a control protocol that is often used as a basis for Voice over Internet Protocol (VoIP) systems. Under SIP, participants in a communications session, as for example an Internet telephone call, may communicate using an Internet Protocol (IP) address provided by an IP layer, substantially independently of a lower-layer transport protocol. Typically, the device which originates an SIP call is a user agent client (UAC), while the device which receives such a call is a user agent server (UAS).

SIP devices may use dialmaps or dialplans to complete phone calls. A dialplan generally describes a pattern of regular expressions that may be consulted to reach a given telephone number. That is, a dialplan enables an SIP device to recognize digit strings dialed by users. Typically, a dialplan is downloaded from an external server and remains constant during its lifetime. A SIP device such as an SIP phone collects and provides digits to a UAS based on a configured dialplan which performs a digit analysis to identify a number being dialed. The UAS performs a digit analysis to identify a number being dialed. If the UAS determines that more digits are needed, the UAS may request that the SIP device provide the digits through handshaking. A digit analysis often requires the expenditure of significant UAS resources and a relatively high amount of network bandwidth.

BRIEF DESCRIPTION OF THE DRAWINGS

The invention will be readily understood by the following detailed description in conjunction with the accompanying drawings, wherein like reference numerals designate like structural elements, and in which.

DESCRIPTION OF EXAMPLE EMBODIMENTS

General Overview

In one embodiment, a method includes obtaining at least a first part of an input string associated with a dialplan. The input string includes at least one character. The method also includes determining if at least a first potential target string stored in a local cache includes the first part of the input string, and accessing an external call manager arrangement if the first potential target string stored in the local cache does not include the first part of the input string.

Description

By effectively having a Session Initiation Protocol (SIP) device such as a SIP phone keep track of what has successfully been dialed in the past, the communications between the SIP phone and a call manager may be reduced. Keeping track of phone numbers a SIP phone has previously dialed allows the SIP phone to potentially avoid having to send individual digits to a call manager such that the call manager may perform a digit analysis. In one embodiment, a SIP phone may intelligently collect and forward collected digits to the call manager such that the use of call manager resources and network bandwidth may be substantially minimized.

A SIP phone may learn, i.e., collect or otherwise accumulate, information pertaining to phone numbers as the phone numbers are dialed using the SIP phone. By storing such information in a cache that is local to the SIP phone, the SIP phone may obtain previously dialed phone number from the cache rather than from a call manager. Further, the need to send individual digits to a call manager such that the call manager may perform a digit analysis may be substantially limited to situations in which the individual digits do not correspond to a phone number that is stored in the cache. That is, the number of SIP messages sent from an SIP phone to a call manager during a dialing process may be reduced.

Figure 1:
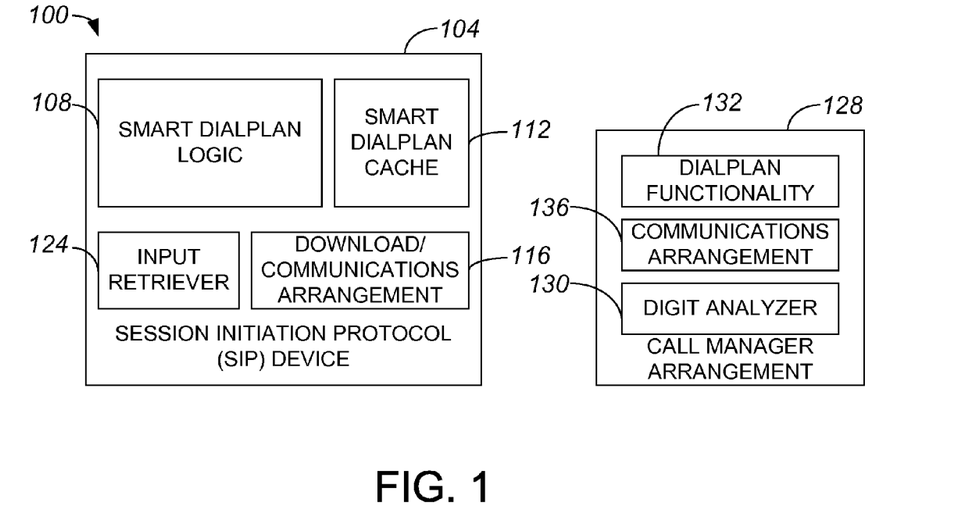
FIG. 1 is a block diagram representation of a system which supports a smart dialplan which allows a device such as a phone to dynamically acquire dialplan information in accordance with an embodiment of the present invention.

A dialplan defines a set of dialing rules that convert user-dialed strings into a format that may be understood by a SIP server, e.g., a SIP device. It should be a SIP phone is but one example of a SIP device which utilizes a dialplan. In one embodiment, a dialplan may be "intelligent" in that rules may be updated, and information that may be used by the dialplan may be accumulated, substantially dynamically while the dialplan is in use. Referring initially to FIG. 1, a system which supports a dialplan, i.e., a smart dialplan, which allows a device such as a phone to dynamically acquire dialplan information will be described in accordance with an embodiment of the present invention. A system 100 includes a SIP device 104 and a call manager arrangement 128 which are in communication, as for example across a network such as a voice over Internet Protocol (VoIP) network. SIP device 104 includes smart dialplan logic 108 that is arranged to implement a dialplan. A download/communications arrangement 116 is arranged to enable SIP device 104 to communicate with call manager arrangement 128. Through download/communications arrangement 116, smart dialplan logic 108 may learn or otherwise obtain information from call manager arrangement 128.

An input retriever 124 of SIP device 104 is arranged to obtain information associated with a string or a phone number to be dialed. In one embodiment, input retriever 124 is a keypad that enables a user to provide digits included in a phone number. A cache 112 is arranged to store information, as for example phone numbers and data associated with the phone numbers, that may be accessed by smart dialplan logic 108. The phone numbers stored in cache 112 may be searched by smart dialplan logic 108 for a match to digits obtained by input retriever 124. If no match to digits is obtained by input retriever 124 is located within cache 112, download/communications arrangement 116 is used to send the digits to a communications arrangement 136 of call manager arrangement 128.

When call manager arrangement 128 receives digits from SIP device 116, call manager arrangement 128 uses a digit analyzer 130 to determine whether the digits are a part of a phone number known to call manager arrangement 128. Once potential matches to a phone number associated with the digits are found using digit analyzer 130, call manager arrangement 128 may provide an indication of whether a call has been successfully completed to SIP device 104 using communications arrangement 136. In general, call manager arrangement 132 also includes dialplan functionality 132.

Figure 2:
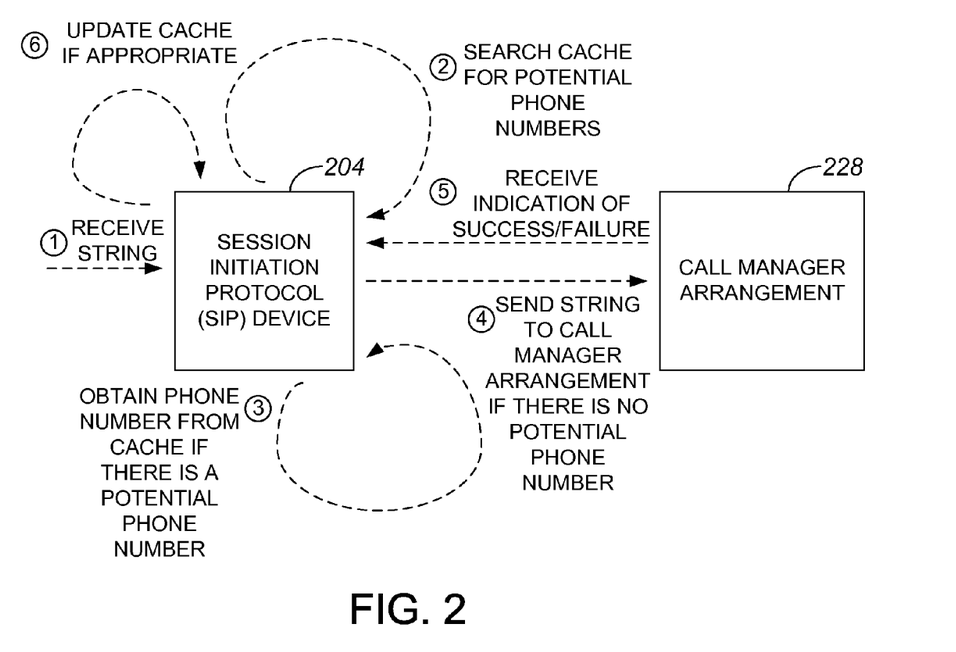
FIG. 2 is a diagrammatic representation of a process of identifying a number using a smart dialplan in accordance with an embodiment of the present invention.

FIG. 2 is a diagrammatic representation of a process of identifying a number using a smart dialplan in accordance with an embodiment of the present invention. A smart dialplan may be a dialplan which allows a SIP device 204 to access a local or internal cache before sending digits or, more generally, characters to an external call manager arrangement 228. Such a dialplan may be utilized with SIP device 204 is used to dial a phone number. Initially, a phone number, which may be provided as a string of digits and/or characters, is provided to SIP device 204. The string may be provided by a caller who enters the string using a keypad (not shown) of SIP device 204. Upon receiving the string, SIP device 204 may search an associated cache (not shown) in an effort to locate a potential match. That is, SIP device 204 may access a local or internal cache to determine if the received string has any potential matches stored in the local or internal cache. If there is at least one potential phone number stored in the cache, that phone number is obtained such that a user may effectively ascertain whether that phone number is the number he or she is attempting to dial. It is only if there are no potential phone numbers stored in the cache that SIP device 204 sends the received string to call manager arrangement 228.

As will be appreciated by those skilled in the art, call manager arrangement 228 may provide an indication of a success or a failure of a call made to the potential phone number. If the indication is an indication of success, then SIP device 204 may update an associated cache (not shown). It should be appreciated that updating an associated cache (not shown) may include purging or otherwise removing older and/or unused entries from the associated cache. Such an update may, in one embodiment, be initiated by call manager arrangement 228.

SIP device 204 may also compact collected digits in an associated cache (not shown) to form an expression. In one embodiment, SIP device 204 may store information into a cache (not shown) in an order in which the least recently used information is stored first. Older entries may be removed from the cache (not shown) to free up space for newer entries. It should be appreciated that there may be certain operations, as for example playing tones or hiding digits from a screen (not shown), that may occur on SIP device 204 during a dialing process. Information regarding the operations may be provided to call manager arrangement 228 or, more generally, a user agent server (UAS) arrangement during a dialing operation. As such, a smart dialplan may store and reply appropriately to the operations during a subsequent dialing period if there is a potential match. Although a call manager arrangement may generally be described, it should be appreciated that the functions of a call manager arrangement may be associated with a UAS arrangement.

Figure 3:
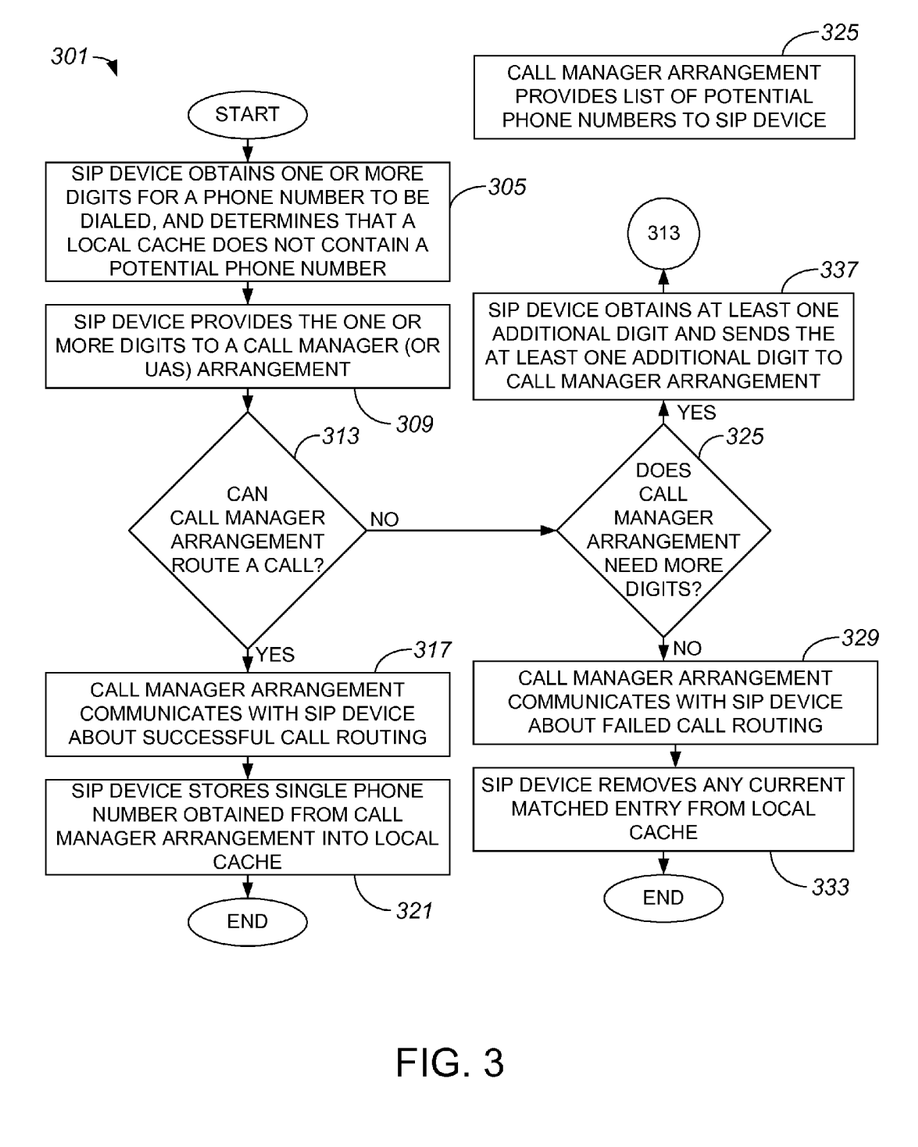
FIG. 3 is a process flow diagram which illustrates a process of utilizing a smart dialplan to accumulate information in a cache in accordance with an embodiment of the present invention.

A cache, e.g., cache 112 of FIG. 1, may be intelligently populated. By way of example, phone numbers may be stored into a cache whenever information indicating that calls are successfully routed or unsuccessfully routed is obtained from a call manager arrangement or a UAS arrangement. By storing such phone numbers into a cache, the need to transmit digits across a network to a call manager arrangement may be reduced to situations in which a particular phone number is not present in the cache. FIG. 3 is a process flow diagram which illustrates a process of storing or otherwise accumulating information in a cache in accordance with an embodiment of the present invention. A process 301 of accumulating information in a cache begins at step 305 in which a SIP device, e.g., a SIP phone, obtains one or more digits for a phone number that is to be dialed, and determines that an internal or local cache does not contain a potential match to the one or more digits. The one or more digits may be collected using a user interface such as a keyboard. The SIP device may access a local cache upon receiving the one or more digits, and search the local cache to identify whether there is a phone number in the local cache that essentially begins with the one or more digits. By way of example, the SIP device may obtain a number '5', and determine that no contents of the local cache begin with a '5'.

In step 309, the SIP device provides the collected digits to a call manager arrangement or a UAS arrangement. Although a call manager arrangement is generally described as communicating with the SIP device, it should be appreciated that a UAS arrangement may instead communicate with the SIP device. The SIP device may send the collected digits to the call manager arrangement over a communications channel within a network. Once the call manager arrangement obtains the collected digits, a determination is made in step 313 as to whether the call manager arrangement may route a call based on the collected digits. That is, it is determined it the call manager arrangement may route a call based on a unique phone number, e.g., the phone number dialed using the provided digits.

If the determination in step 313 is that the call manager arrangement may route a call, or effectively identify substantially only the single phone number, the call manager arrangement communicates with the SIP device in step 317. In communicating with the SIP device, the call manager arrangement informs the SIP device that a call has been successfully routed, and may provide the dialed phone number to the SIP device. Then, in step 321, the SIP device stores the single phone number obtained from the call manager arrangement into a local cache in step 321. Storing the single phone number into the local cache may include, but is not limited to including, storing both the single phone number and a time at which the single phone number was obtained into the local cache. In one embodiment, storing the single phone number may include first clearing space in the local cache. After the single phone number is stored, the process of accumulating information in a cache is completed.

Returning to step 313, if the determination is that the call manager arrangement has not successfully routed a call, the indication may be that the call manager arrangement has either identified a plurality of potential phone numbers that include the one or more digits, or there is no valid phone number that includes the one or more digits. Accordingly, process flow moves to step 325 in which it is determined whether the call manager arrangement needs more digits.

If the determination in step 325 is that the call manager arrangement requires additional digits, then the SOP device obtains at least one additional digit in step 337, and sends the at least one additional digit to the call manager arrangement.

Then, process flow returns to step 313 in which it is determined if the call manager arrangement may route the call.

Alternatively, if it is determined in step 325 that the call manager arrangement does not require additional digits, the indication is that a call based on the provided digits may not be routed. As such, in step 329, the call manager arrangement communicates with the SIP device about a failed call routing. Then, in step 333, the SIP device may remove any current matched entry associated with the provided digits from the local cache. In other words, any entries associated with a phone number associated with the failed call routing may be removed. By way of example, if a complete phone number was provided in step 309, and that phone number did not result in a call being routed, that phone number may be removed from the local cache in step 333. Upon removing any current matched entry from the local cache, the process of accumulating information in a cache is completed.

Figure 4A:
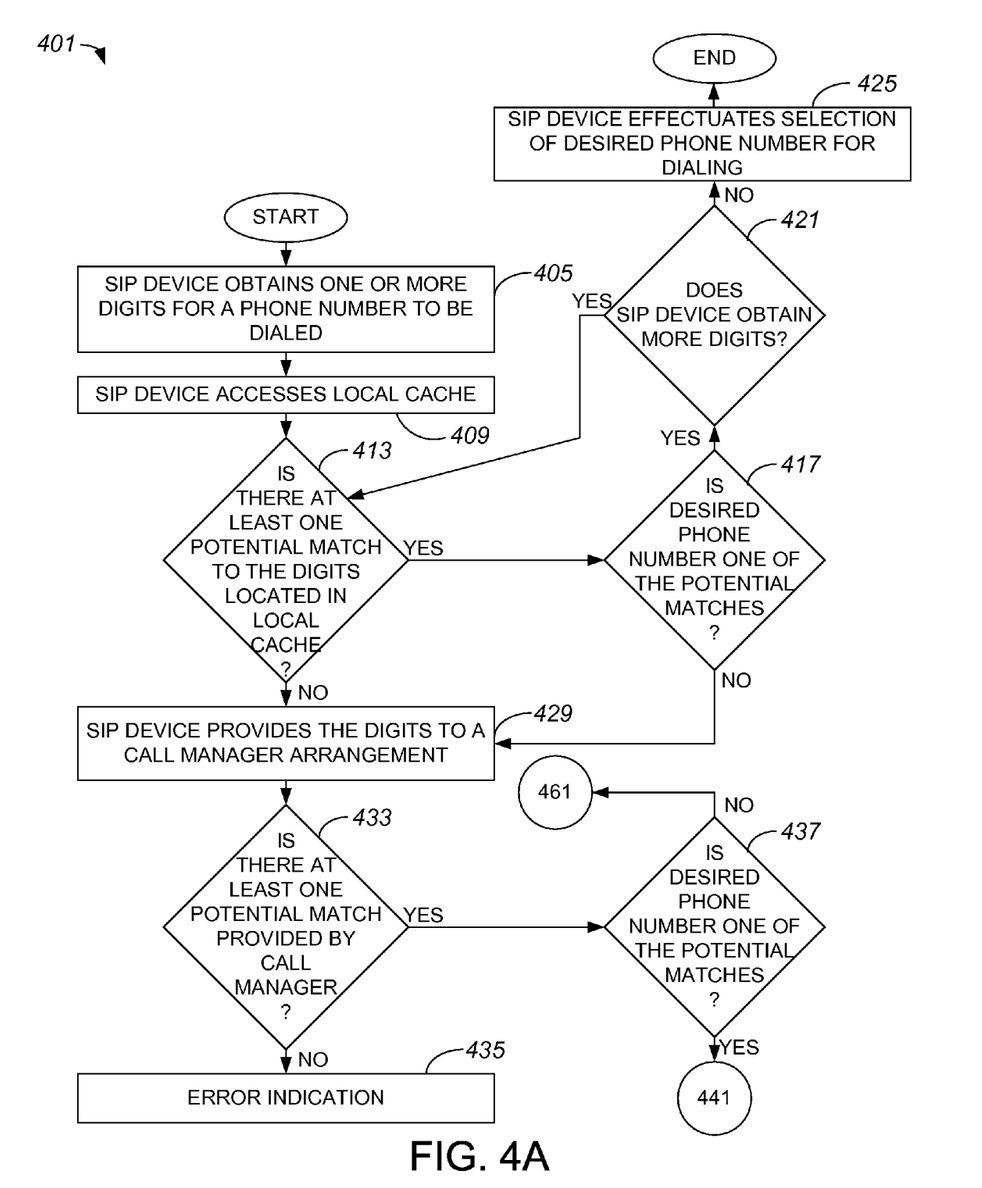
FIGS. 4A-C are a process flow diagram which illustrates a process of dialing an overall phone number using a smart dialplan in accordance with an embodiment of the present invention.
Figure 4B:
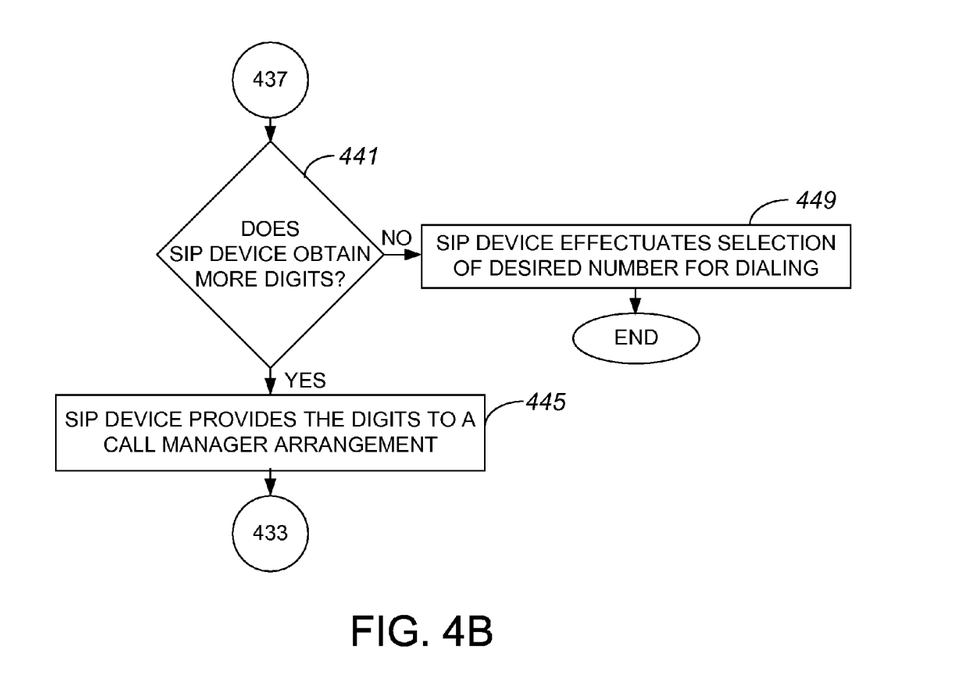
Figure 4C:
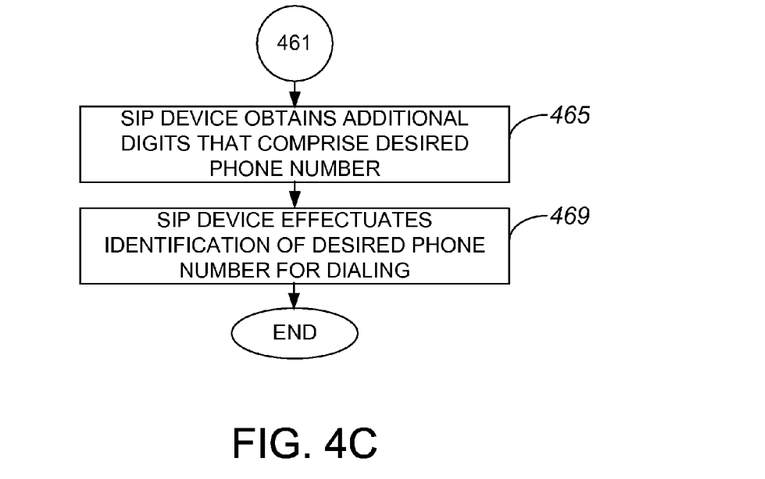

A smart dialplan is configured to access a local cache in which previously dialed phone numbers are stored. The smart dialplan generally accesses the local cache as a part of a dialing process. FIGS. 4A-C are a process flow diagram which illustrates a process of dialing an overall phone number using a smart dialplan in accordance with an embodiment of the present invention. A process 401 of dialing a phone number begins at step 405 in which a SIP device obtains one or more digits associated with a phone number that is to be called. In other words, a SIP device receives digits that are associated with a phone number that is to be dialed. Once the SIP device obtains at least one digit or, more generally, at least one character associated with a phone number to be dialed, the SIP devices accesses a local smart dialplan cache in step 409. In one embodiment, the local smart dialplan cache may be included within the SIP device.

It is determined in step 413 whether the local smart dialplan cache contains at least one potential match to the one or more obtained digits. That is, a determination is mad as to whether there are any phone numbers stored in the local cache that include the one or more obtained digits. Typically, it is determined if any of the phone numbers stored in the local cache begin with the one or more obtained digits, although it should be appreciated that the one or more obtained digits are not limited to being substantially at the beginning of a phone number.

If the determination is that there is not at least one potential match in the local cache to the one or more digits, the implication is that a desired or target phone number to be dialed is to be obtained from a call manager arrangement. Accordingly, in step 429, the SIP device provides the one or more digits obtained in step 405 to a call manager arrangement. After the SIP device provides the one or more digits to the call manager arrangement, it is determined in step 433 whether the call manager has provided at least one potential match on the dialed phone number. In the described embodiment, if the call manager arrangement does not provide at least one potential match to the call manager arrangement, an error indication is created in step 435.

Alternatively, if the determination in step 433 is that there is at least one potential match communicated by the call manager arrangement, it is then determined in step 437 if the desired phone number is one of the potential matches provided by the call manager arrangement. If the determination is that the desired phone number is not one of the potential matches, process flow proceeds to step 441 and a determination of whether the SIP device has obtained additional digits. If it is determined that the SIP device has not obtained additional digits, the SIP device effectuates the selection of the desired number for dialing in step 449, and the process of dialing an overall phone number is completed. On the other hand, if it is determined in step 441 that the SIP device has obtained additional digits, the SIP device then provides the additional digits to a call manager arrangement in step 445. Once the additional digits are provided to the call manager arrangement, process flow returns to step 433 in which it is determined if there is at least one potential match provided by the call manager arrangement.

Returning to step 437, if it is determined that the desired phone number is not one of the potential matches, then in step 465, the SIP device obtains additional digits that comprise the desired phone number from a call manager or, more generally, a UAS. Then, in step 469, the SIP device effectuates the identification of a desired phone number for dialing, as for example by obtaining all digits of the desired phone number from a user via a user interface. Upon causing the desire phone number for dialing to be identified, the process of dialing an overall phone number is completed.

Referring back to step 413, if the determination is that there is at least one potential match in the local cache to the one or more obtained digits, then it is effectively decided in step 417 whether one of the potential matches is the desired phone number to be dialed. Such a determination may include allowing a user, as for example a user of the SIP device, to essentially select one of the potential matches as being the phone number he or she is attempting to dial. If it is determined that the desired phone number is not one of the potential matches, process flow proceeds to step 429 in which the SIP device provides the one or more digits for the desired phone number to a call manager arrangement.

Alternatively, if it is determined in step 417 that the desired phone number is one of the potential matches, the indication is that a user may select the desired phone number from the potential matches. Selecting the desired phone number may include, but is not limited to including, utilizing a user interface associated with the SIP device to physically selecting the desired phone number for dialing, or providing additional digits associated with the phone number to be dialed. Such additional digits may be intended to completely specify the phone number to be dialed.

If the desired phone number is one of the potential matches, process flow moves to step 421 in which it is determined if the SIP device has obtained additional digits. In the event that the SIP device obtains more digits, process flow returns to step 413 in which it is determined if there is still at least one potential match to the digits located in the local cache. Alternatively, if it is determined that the SIP device has not obtained more digits, then the SIP device effectuates the selection of the desired phone number for dialing in step 425, and the process of dialing a phone number is completed.

Whether a dialing process results in sending digits from a SIP device to a call manager is at least partially dependent on the contents of a local smart dialplan cache associated with the SIP device. By way of example, the first time a SIP device that has dialplan functionality is used, the local smart dialplan cache associated with the SIP device may be substantially empty. As such, any digits that are provided to the SIP device by a user, or a dialer, may be sent to a call manager. However, if the same string or sequence of digits is subsequently provided, the digits may have potential matches in the local smart dialplan cache, and there may be no need to send the digits to the call manager.

Figure 5:
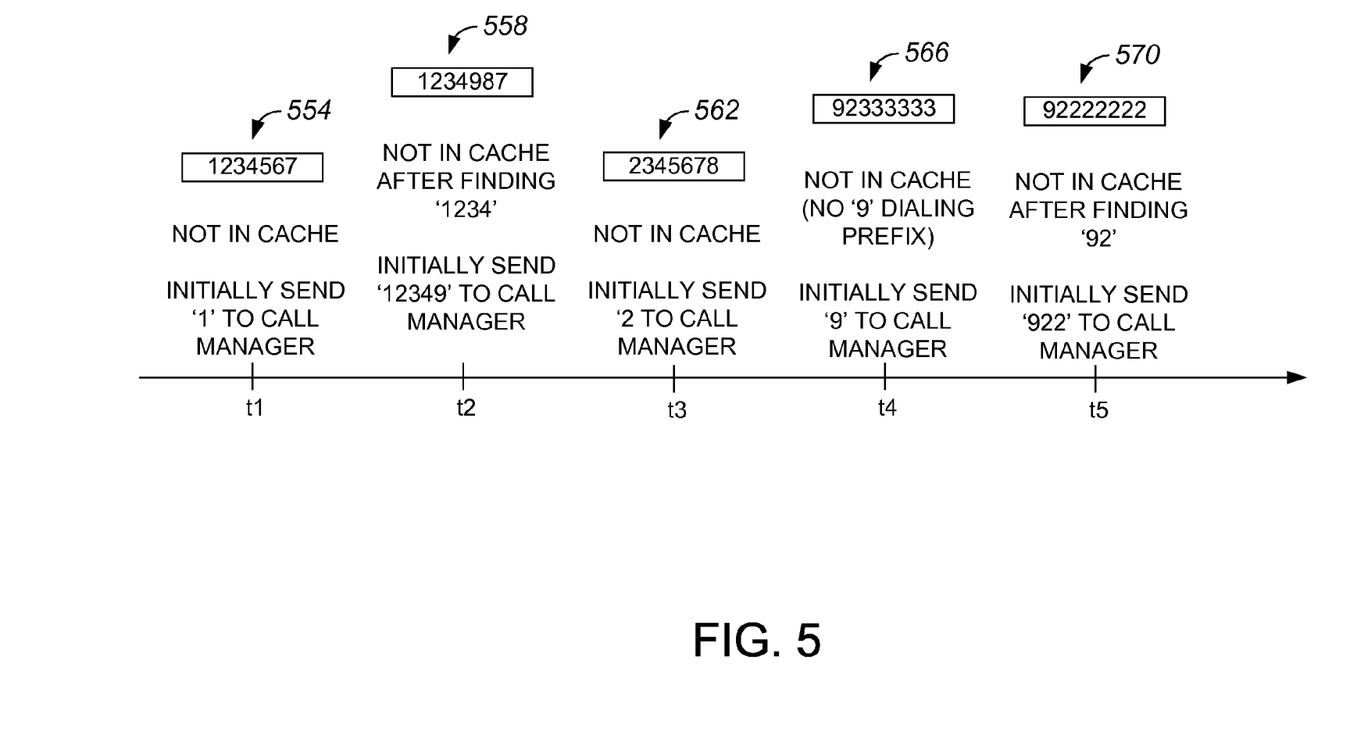
FIG. 5 is a diagrammatic representation of one example of dialing a series of phone numbers in accordance with an embodiment of the present invention.

With reference to FIG. 5, one example of dialing a series of phone numbers will be described in accordance with an embodiment of the present invention. FIG. 5 is a timeline which indicates when certain strings, e.g., phone numbers, are at least partially dialed. For purposes of illustration, a local cache of a SIP device is substantially empty when a first string 554 is at least partially dialed or otherwise inputted by a user at a time t1. At time t1, a string '1234567' 554, which corresponds in the described embodiment to a phone number, is dialed one digit at a time. String 554 is not stored in a local cache. As no phone numbers stored in the local cache begin with a digit '1', the digit '1' is initially sent to a call manager. Subsequent digits associated with string 554 may also be sent to the call manager, as long as an actual phone number that corresponds to string 554 has yet to be located by the call manager and/or selected by a user using the SIP device.

Once string 554 is effectively successfully completed, string 554 may be stored in the local cache. At a time t2, a string '1234987' 558 may be dialed one digit at a time. A digit or partial string of '1', a partial string of '12', a partial string of '123', and a partial string of '1234' may be found in the local cache, as string '1234567' 554 is present in the local cache. Hence, a call manager is not accessed until a partial string of '12349' is processed. After it is determined that the partial string of '12349' is not located in the local cache, the partial string of '12349' is sent to the call manager. When the call manager allows string 558 to be dialed, string 558 may then be stored in the local cache.

At a time t3, a string '2345678' 562 is dialed one digit at a time. The local cache does not contain any phone number that includes the digits of string 562. As such, each individual digit may be sent one-at-a time to the call manager, starting with a digit '2'. After string 562 is dialed, string 562 may be stored in the local cache.

At a time t4, a string '92333333' 566 may be dialed one digit at a time. In the described embodiment, a digit '9' at the beginning of string 566 indicates that subsequent digits are associated with an external phone number, or a phone number that may not be directly dialed without first accessing an external phone line. That is, a digit '9' at the beginning of string 566 is a dialing prefix. The local cache does not contain any phone numbers with a dialing prefix. Accordingly, each individual digit may be sent one-at-a time to the call manager, starting with a digit '9'. Once string 566 is dialed, string 566 may be stored in the local cache.

A string '92222222' 570 may be dialed one digit at a time. A digit or partial string of '9' and a partial string of '922' may be found in the local cache, because string '92333333' 566 is present in the local cache. Therefore, a call manager is not accessed until a partial string of '922' is processed, as no potential match to the partial string of '922' is present in the local cache. Once it is ascertained that the partial string of '922' is not found in the local cache, the partial string of '922' is sent to the call manager. When the call manager allows string 570 to be dialed, string 570 may then be stored in the local cache.

Figure 6:
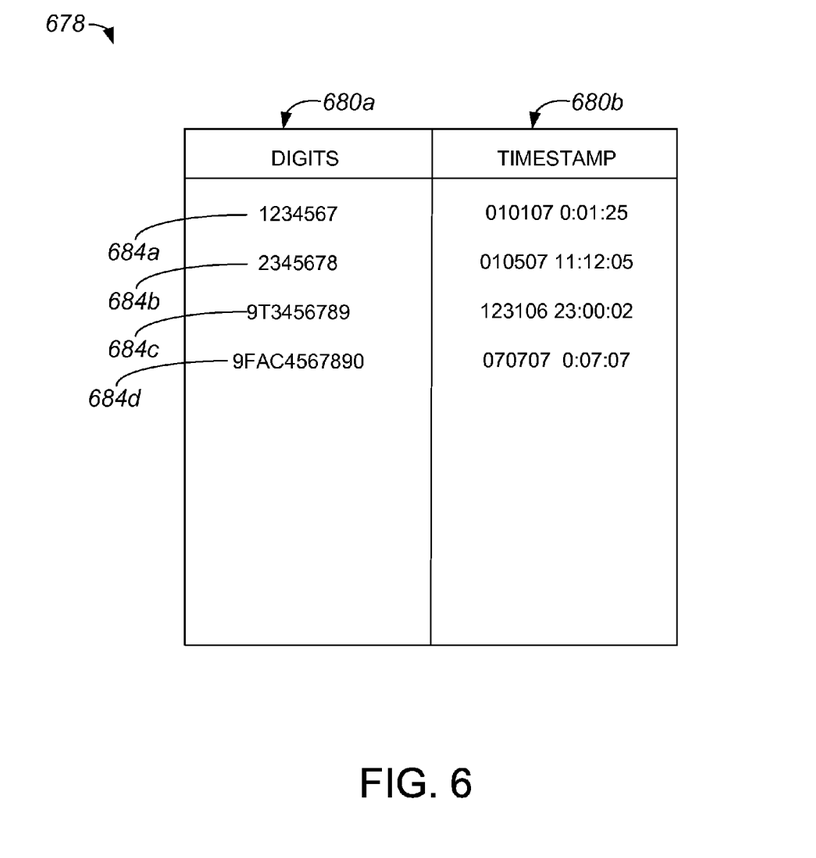
FIG. 6 is a diagrammatic representation of one data structure in which phone numbers may be stored in a cache that is accessible to a smart dialplan in accordance with an embodiment of the present invention.

FIG. 6 is a diagrammatic representation of one data structure in which phone numbers may be stored in an internal or local cache that is accessible to a smart dialplan in accordance with an embodiment of the present invention. A data structure 678 may be substantially any data structure that may be indexed and/or searched. Data structure 678 may be, but is not limited to being, a table that includes a plurality of columns 680a, 680b in which entries 684a-d are stored. A column 680a may be arranged to store dialed digits, e.g., phone numbers, while a column 680b may be arranged to store information associated with the contents of column 680a. The information may include, in one embodiment, timestamps. Timestamps may be information that indicates the most recent times particular digits were dialed. Other information stored in column 680b may include a number (not shown) of times particular digits were dialed.

Entries 684a-d include both dialed digits and timestamp information. In one embodiment, dialed digits in entries 684a-d may include indications of playing secondary dialtones and digit masking, or substantially any other operation that is associated with the dialing of digits. For example, an entry 684c may include a '9T' as well as a phone number '3456789'. The '9T' may indicate that a '9' is first dialed in order to dial a phone number '3456789', which is an external phone number, e.g., a phone number that is external to a VoIP network of which the SIP device is a part. The 'T' may be arranged to indicate that a secondary dialtone is to be played after the '9' is dialed. The indication that a secondary dialtone is to be played may be received by the SIP device when there is no corresponding entry in the smart dialplan cache, and subsequently added to the smart dialplan cache based on external call manager or UAS communications. An entry 684d may include a '9FAC' as well as a phone number '4567890'. In one embodiment, the '9' may be an external dialing prefix, and the 'FAC' may indicate that phone number '4567890' is to be substantially masked when dialed. It should be appreciated that similar indications, i.e., indications other than 'T' or 'FAC', may be added for other operations associated with digit dialing.

A data structure such as data structure 678 may become too full to store additional data, as the size of a cache that contains the data structure may be relatively limited. In order to ensure that newly dialed phone numbers may be stored into a data structure, data may be purged from the data structure or, more generally, the cache. Data purging may be performed on an as needed basis, as for example when a newly dialed phone number is to be stored into an already full data structure, or periodically, as for example at predetermined intervals. The selection of which phone number to purge or otherwise remove from a data structure may be based on a variety of factors which include, but are not limited to including, the number of times each phone number has been dialed and the most recent time at which each phone number was dialed. As previously mentioned, a call manager or a UAS may substantially request that phone numbers be purged or otherwise removed from a data structure. The data structure, which may be embodied in substantially any suitable form, may also be compacted based on similar entries.

Figure 7:
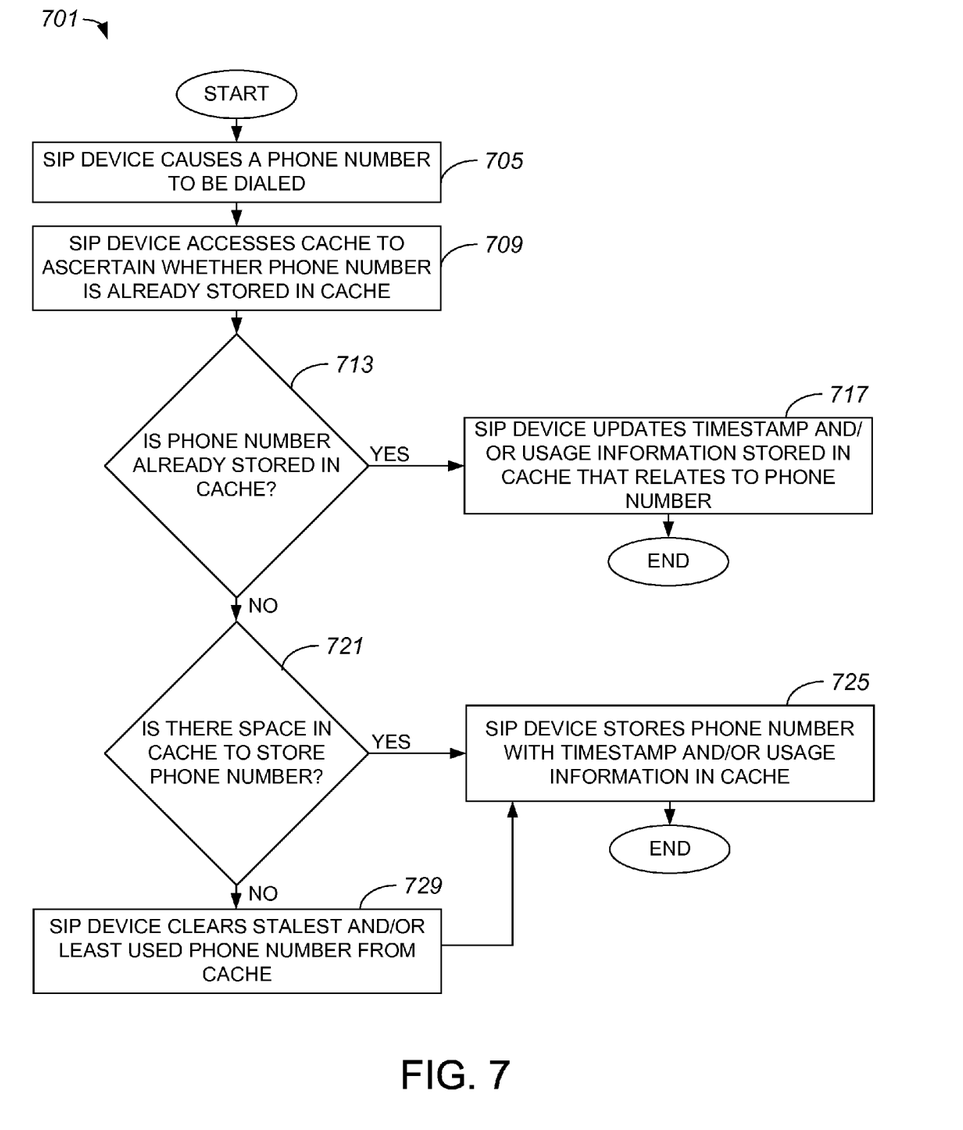
FIG. 7 is a process flow diagram which illustrates a method of managing a cache associated with a smart dialplan in accordance with an embodiment of the present invention.

FIG. 7 is a process flow diagram which illustrates a method of managing a cache associated with a smart dialplan in accordance with an embodiment of the present invention. A process 701 of managing a cache begins at step 705 in which a SIP device causes a phone number to be dialed. Once the phone number is dialed, the SIP device may access a local cache in step 709 to ascertain whether the dialed phone number is already stored in the local cache.

A determination is made in step 713 regarding whether the dialed phone number is already stored in the cache. If it is determined that the dialed phone number is already stored in the cache, then process flow moves to step 717 in which the SIP device updates an entry in the local cache that corresponds to the dialed phone number. In one embodiment, a current timestamp and/or usage information, e.g., a number of times the phone number has been dialed, may be updated for an entry pertaining to the dialed phone number. The process of managing a cache is completed upon updating information relating to the dialed phone number.

Returning to step 713, if it is determined that the dialed phone number is not already stored in the local cache, a determination is made in step 721 as to whether there is space in the local cache in which to store the dialed phone number. In other words, it is determined whether the resources allocated for the storage of phone numbers within the local cache have substantially all been used. If it is determined that there is available space in the local cache in which to store the dialed phone number, then the SIP device stores the dialed phone number in the local cache in step 725. Storing the dialed phone number may include storing a timestamp and/or usage information along with the dialed phone number. Once the SIP device stores the dialed phone number in the local cache, the process of managing a cache is completed.

Alternatively, if it is determined in step 721 that there is no available space in the local cache in which the dialed phone number may be stored, the SIP device may purge some data that is stored in the local cache in step 729. Purging data may include, but is not limited to including, identifying then clearing the stalest and/or the least used phone number from the local cache. It should be appreciated that in the event that the SIP device is unable to purge data, an error indication may be provided. However, for purposes of illustration, it is assumed that the SIP device may successfully clear space in the local cache. The amount of space cleared may vary widely. By way of example, either just enough space to store information pertaining to the dialed phone number may be cleared, or space sufficient to store information pertaining to a plurality of phone numbers may be cleared in anticipation of storing phone numbers.

After space is availed in the local cache, the SIP device stores the dialed phone number in the local cache in step 725. The SIP device may also store timestamp and/or usage information for the dialed phone number in the local cache. Upon storing the dialed phone number in the local cache, the process of managing a cache is completed.

Although only a few embodiments of the present invention have been described, it should be understood that the present invention may be embodied in many other specific forms without departing from the spirit or the scope of the present invention. By way of example, a data structure in which previously dialed phone numbers may be managed such that the dialed phone numbers are ordered in a particular order. The dialed phone numbers may be sorted substantially in numerical order, substantially based on a number of times each phone number has been dialed, and/or based on the most recent time each phone number has been dialed.

The present invention has been described as being suitable for use in an overall network that supports SIP devices, e.g., in a network that includes SIP devices that are in communication with a call manager. It should be appreciated, however, that an intelligent dialplan is not limited to being implemented with respect to SIP devices. In general, logic that allows a device to maintain a cache of previously dialed phone numbers, and to access a call manager using a plurality of digits when potential phone numbers are not found in the cache, may be implemented with respect to substantially any IP network that supports a call setup and call signaling protocol. By way of example, an intelligent dialplan may be implemented with respect to a device that supports a H.323 protocol.

In one embodiment, a smart dialplan configuration associated with a call manager arrangement or a UAS arrangement may change, e.g., due to new system requirements. In such an embodiment, the call manager arrangement may communicate information relating to the change to a SIP device. The SIP device, in turn, may make appropriate updates and clear associated entries from a local cache.

The steps associated with the methods of the present invention may vary widely. Steps may be added, removed, altered, combined, and reordered without departing from the spirit of the scope of the present invention. For example, if a call manager arrangement fails to identify any potential phone numbers upon obtaining a string from an SIP device, the call manager arrangement may provide an error notification to the SIP device. The call manager arrangement may fail to identify any potential phone numbers in the event that the string includes characters that are not recognized by the call manager arrangement, or characters that are inconsistent with phone numbers. Therefore, the present examples are to be considered as illustrative and not restrictive, and the invention is not to be limited to the details given herein, but may be modified within the scope of the appended claims.

What is claimed is:

1. A method comprising:
    obtaining at least a first part of an input string associated with a dialplan, the input string including at least one character;
    determining if at least a first potential target string stored in a local cache includes the first part of the input string, the local cache being arranged to store dialed digits and timestamp information, the timestamp information being arranged to indicate times at which the dialed digits were dialed, wherein the at least first target string corresponds to a first set of dialed digits;
    accessing an external call manager arrangement if it is determined that at least the first potential target string stored in the local cache does not include the first part of the input string, wherein the first part of the input string includes approximately all of the input string, and accessing the external call manager arrangement includes accessing the external call manager using approximately all of the input string;
    obtaining the actual target string from the external call manager arrangement, wherein obtaining the actual target string from the external call manager arrangement includes obtaining information associated with the actual target string; and
    adding the first part of the input string to the local cache after accessing the external call manager arrangement, wherein adding the first part of the input string to the local cache after accessing the external call manager arrangement includes storing the actual target string in the local cache.

2. The method of claim 1 wherein accessing the external call manager arrangement includes providing the first part of the input string to the external call manager arrangement.

3. The method of claim 2 wherein accessing the external call manager arrangement further includes communicating with the external call manager arrangement to ascertain whether a call may be successfully routed.

4. The method of claim 1 wherein the at least one character is at least one number, the first potential string is a first set of numbers, and the input string is a second set of numbers.

5. The method of claim 1 further including:
    obtaining at least an additional part associated with the input string if it is determined that at least the first potential target string stored in the local cache includes the first part of the input string.

6. The method of claim 1 wherein the input string includes a telephone number.

7. The method of claim 1 further including:
    dialing a first telephone number associated with the first potential target string if it is determined that at least the first potential target string stored in the local cache includes the first part of the input string; and
    dialing a second telephone number associated with the actual target string if it is determined that at least the first potential target string stored in the local cache does not include the first part of the input string.

8. The method of claim 1 wherein the at least first part of the input string associated with the dialplan is obtained by a Session Initiation Protocol (SIP) device that includes the local cache, and wherein the external call manager arrangement is in communication with the SIP device through a network.

9. Logic encoded in one or more tangible media for execution and when executed operable to:
   obtain at least a first part of an input string associated with a dialplan, the input string including at least one character;
   determine if at least a first potential target string stored in a local cache includes the first part of the input string, the local cache being arranged to store dialed digits and timestamp information, the timestamp information being arranged to indicate times at which the dialed digits were dialed, wherein the at least first target string corresponds to a first set of dialed digits;
   access an external call manager arrangement if it is determined that at least the first potential target string stored in the local cache does not include the first part of the input string, wherein the first part of the input string includes approximately all of the input string, and the logic operable to access the external call manager arrangement is operable to access the external call manager using approximately all of the input string;
   obtain the actual target string from the external call manager arrangement, wherein the logic operable to obtain the actual target string from the external call manager arrangement is operable to obtaining information associated with the actual target string; and
   add the first part of the input string to the local cache after accessing the external call manager arrangement, wherein the logic operable to add the first part of the input string to the local cache after accessing the external call manager arrangement is operable to store the actual target string in the local cache.

10. The logic of claim 9 wherein the logic operable to access the external call manager arrangement is further operable to provide the first part of the input string to the external call manager arrangement.

11. The logic of claim 10 wherein the logic operable to access the external call manager arrangement is further operable to obtain an actual target string that includes the first part of the input string.

12. The logic of claim 9 wherein the at least one character is at least one number, the first potential string is a first set of numbers, and the input string is a second set of numbers.

13. The logic of claim 9 further operable to:
   obtain at least an additional part associated with the input string if it is determined that at least the first potential target string stored in the local cache includes the first part of the input string.

14. The logic of claim 9 wherein the input string includes a telephone number.

15. The logic of claim 9 further operable to:
   dial a first telephone number associated with the first potential target string if it is determined that at least the first potential target string stored in the local cache includes the first part of the input string; and
   dial a second telephone number associated with the actual target string if it is determined that at least the first potential target string stored in the local cache does not include the first part of the input string.

16. An apparatus comprising:
   means for obtaining at least a first part of an input string associated with a dialplan, the input string including at least one character;
   means for determining if at least a first potential target string stored in a local cache includes the first part of the input string;
   means for accessing an external call manager arrangement if it is determined that at least the first potential target string stored in the local cache does not include the first part of the input string, wherein the first part of the input string includes approximately all of the input string, and the means for accessing the external call manager arrangement include means for accessing the external call manager using approximately all of the input string;
   means for obtaining the actual target string from the external call manager arrangement, wherein the means for obtaining the actual target string from the external call manager arrangement include means for obtaining information associated with the actual target string; and
   means for adding the first part of the input string to the local cache after accessing the external call manager arrangement, wherein the means for adding the first part of the input string to the local cache after accessing the external call manager arrangement include means for storing the actual target string in the local cache.

* * * * *